United States Patent Office 3,130,209
Patented Apr. 21, 1964

3,130,209
17α-ACYLOXY-16-METHYLPREGNANE DERIVATIVES AND PROCESS FOR PRODUCING SAME
Vladimir Petrow and David Morton Williamson, London, England, assignors to The British Drug Houses Limited
No Drawing. Filed Aug. 22, 1961, Ser. No. 133,030
Claims priority, application Great Britain Aug. 25, 1960
8 Claims. (Cl. 260—397.4)

This invention is for improvements in or relating to organic compounds and has particular reference to new 17α-acyloxy-16-methylpregnane derivatives which compounds are believed to be 16α-methyl derivatives.

The compounds of the present invention are of value on account of their biological properties and selective hormonal activity. They possess very strong progestational activity on oral administration.

It is an object of the present invention to provide the new compounds

17α-acetoxy-6α,16α-dimethylpregn-4-ene-3,20-dione (I; R=—CH—CH$_2$, R'=CO.CH$_3$)
          |
          CH$_3$ 17α-acetoxy-16α-methylpregn-4-ene-3,20-dione (I; R=—CH$_2$—CH$_2$—, R'=COCH$_3$)

17α-acetoxy-16α-methylpregna-4,6-diene-3,20-dione (I; R=—CH=CH—, R'=COCH$_3$)

It is a further object of the present invention to provide the new intermediates 3β-acetoxy-17α-hydroxy-6,16α-dimethylpregn-5-ene-20-one (Formula II below; R=CH$_3$, R'=H, R''=COCH$_3$)
3β-acetoxy-17α-hydroxy-16α-methylpregn-5-en-20-one (II; R=R'=H, R''=COCH$_3$)
3β,17α-diacetoxy-6,16α-dimethylpregn-5-en-20-one (II; R'=R''=COCH$_3$, R=CH$_3$)
3β,17α-diacetoxy-16α-methylpregn-5-en-20-one (II; R'=R''=COCH$_3$, R=H)

It is also an object of this invention to provide a new and improved process for the preparation of 17α-acetoxy-6,16α-dimethylpregna-4,6-diene-3,20-dione (I; R=—C=CH—, R'=Ac)
       |
       CH$_3$ According to the present invention there is provided a process for the preparation of 17α-acyloxy-16α-methylpregnane derivatives having the general formula

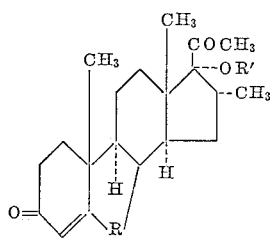

(I)

where

R=—CH—CH$_2$, —CH$_2$—CH$_2$—, —CH=CH— or —C=CH—
   |                                         |
   CH$_3$                                     CH$_3$ and R' is an acyl group containing up to six carbon atoms which process comprises selectively hydrogenating the 16-methylene group of a 3β-acyloxy-17α-hydroxy-16-methylenepregn-5-en-20-one of general formula

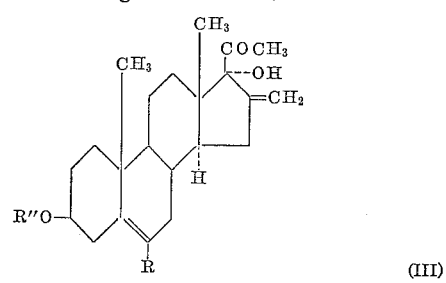

(III)

(where R is hydrogen or methyl and R'' is an acyl group containing up to six carbon atoms) to yield the 16α-methyl derivative of general formula

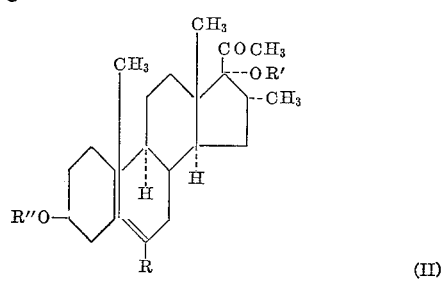

(II)

(where R is hydrogen or methyl, R' is hydrogen and R'' is an acyl group containing up to six carbon atoms), acylating the 17α-hydroxy group to give a 3β,17α-diacyloxy-16α-methyl derivative of general Formula II (where R is hydrogen or methyl and R' and R'' are acyl groups containing up to six carbon atoms), selectively hydrolysing the 3β-acyloxy group to give a 17α-acyloxy-3β-hydroxy-16α-methyl derivative of general Formula II (where R is hydrogen or methyl, R' is acyl and R'' is hydrogen) and oxidising to convert the 3β-hydroxy-Δ$^5$ derivative (II; R=H or CH$_3$, R'=acyl, R''=H) into the desire Δ$^4$-3-ketone or Δ$^{4,6}$-3-ketone.

The selective hydrogenation of the 16-methylene group is performed by shaking or stirring a solution of the compound in an inert solvent, preferably methanol or ethanol in an atmosphere of hydrogen under a pressure at or about atmospheric pressure (preferably between 1 and 2 atmospheres), in the presence of a pre-reduced catalyst which can be palladium on calcium carbonate or on barium carbonate but which is preferably palladium on charcoal until the calculated amount of hydrogen has been absorbed.

Conversion of the 17α-hydroxyl group to the ester may be carried out by any of the methods, known to those skilled in the art, for the acylation of tertiary hydroxyl groups. These include treatment with the anhydride of an aliphatic carboxylic acid in the presence of an acid catalyst, such as toluene-p-sulphonic acid monohydrate, in solution in the corresponding aliphatic carboxylic acid, at temperatures between room temperature and 100° C. Alternatively the esterification may be effected with the chloride or the anhydride of an aliphatic carboxylic acid in the presence of a base or of an inert solvent containing a base at between 100° C. and 140° C.

Selective hydrolysis of the 3β-acyloxy group in the presence of the 17α-acyloxy group is achieved by acid hydrolysis. The diacyloxy derivative in solution in methanol or ethanol containing a small quantity of mineral acid preferably hydrochloric acid, is heated under reflux for 1 to 3 hours. The hydrolysis is generally complete in 90 minutes.

Oxidation of 17α-acyloxy-3β-hydroxy - 16α - methylpregn-5-en-20-one derivatives (II; R is a hydrogen or methyl, R'=acyl containing up to six carbon atoms, R''=H) into the corresponding $\Delta^4$-3-ketones or $\Delta^{4,6}$-3-ketones (I; where R and R' are as hereinabove defined) may be performed under Oppenauer conditions or with p-benzoquinone.

Thus the oxidation of the 3-hydroxy-$\Delta^5$-steroid to the corresponding $\Delta^4$-3-ketone may be performed by oxidation of the Oppenauer type using cyclohexanone, methyl ethyl ketone or acetone as the hydrogen acceptor and aluminium tert.-butoxide or aluminium isopropoxide as the catalyst in an inert solvent such as toluene at the reflux temperature of the mixture for between 30 minutes to 3 hours. This conversion may also be carried out by oxidation of the 3-hydroxyl group to the ketone with chromic acid followed by isomerisation of the $C_5$-$C_6$ unsaturation to the conjugate $C_4$-$C_5$ position with acid.

The $\Delta^{4,6}$-3-ketone is best obtained from the $\Delta^5$-3β-hydroxyl derivative by a modified Oppenauer type procedure in which the oxidation is carried out in an inert solvent such as dioxan, tetrahydrofuran, benzene or toluene with p-benzoquinone as hydrogen acceptor and aluminium tert-butoxide or aluminium iso-propoxide as catalyst, at temperatures up to the boiling point of the mixture and for periods of from 30 minutes to 3 days. The shorter times are required at the higher temperatures, but 3 days at room temperature are the preferred conditions for optimum yields.

The 3β-acetoxy-17α-hydroxy-6-methyl-16 - methylenepregn-5-en-20-one derivative (III; R''=COCH$_3$, R=CH$_3$) employed as a starting material in the process of this application is fully described in our copending patent application No. 51,801, filed August 25, 1960, now Patent No. 3,047,591, while the other starting material 3β-acetoxy-17α-hydroxy-16-methylenepregn-5-en - 20 - one (III; R''=COCH$_3$, R=H) is described in our publication "Modified Steroid Hormones, Part XIV," J. Chem. Soc., 1960, 2385.

Following is a description by way of example of methods of carrying the invention into effect.

EXAMPLE 1

*3β-Acetoxy-17α-Hydroxy-16α-Methylpregn-5-En-20-One*

(II; R=R'=H, R''=COCH$_3$)

3β-acetoxy-17α-hydroxy-16-methylenepregn-5-en - 20-one (III; R=H, R''=COCH$_3$) (5 g.) dissolved in absolute ethanol (750 ml.) was shaken in an atmosphere of hydrogen at atmospheric pressure with 5% palladium on charcoal (1 g.) until 300 mls. hydrogen had been taken up. The catalyst was filtered off and the filtrate evaporated under reduced pressure. The residue was crystallised from methanol to give 3β-acetoxy-17α-hydroxy - 16α-methylpregn-5-en-20-one, M.P. 208 to 209° C., $[\alpha]_D^{26}$ −75° (c., 0.97 in CHCl$_3$).

*3β,17α-Diacetoxy-16α-Methylpregn-5-En-20-One*

(II; R=H, R'=R''=Ac)

To the foregoing compound (II; R=R'=H, R''=Ac) (2 g.) dissolved in acetic anhydride (10 ml.) on the steam bath was added toluene-p-sulphonic acid monohydrate (0.2 g.) and the mixture was kept at 90° C. for 30 minutes and then poured into ice/water. The solids were collected and crystallised from methanol to give 3β,17α-diacetoxy-16α-methylpregn-5-en-20-one, M.P. 173 to 174° C., $[\alpha]_D^{26}$ −48° (c., 0.95 in CHCl$_3$).

*17α-Acetoxy-3β-Hydroxy-16α-Methylpregn-5-En-20-One*

(II; R=R''=H, R'=Ac)

The above diacetate (II; R=H, R'=R''=Ac) (2 g.) was refluxed in methanol (100 ml.) containing concentrated hydrochloric acid (1 ml.) for 90 minutes and then poured into ice/water. The precipitated solids were collected and crystallised from methanol to yield 17α-acetoxy-3β-hydroxy-16α-methylpregn-5-en-20 - one, M.P. 208 to 210° C., $[\alpha]_D^{26}$ −41° (c., 1.02 in CHCl$_3$).

*17α-Acetoxy-16α-Methylpregn-4-Ene-3,20-Dione*

(I; R=—CH$_2$—CH$_2$—, R'=Ac)

The foregoing hydroxyacetate (II; R=R''=H, R'=Ac) (1 g.) in cyclohexanone (24 ml.) was added to aluminium tert.-butoxide (2 g.) dissolved in dry toluene (16 ml.) and the mixture was heated under reflux for 30 minutes. Rochelle salt solution was added and the organic solvents removed by steam distillation. The product was isolated with ether and the residue from the ether extracts was crystallised from methanol to give 17α - acetoxy - 16α-methylpregn-4-ene-3,20-dione needles, M.P. 233 to 235° C., $[\alpha]_D^{26}$ +84° (c., 0.34 in CHCl$_3$)

$\lambda_{max.}^{EtOH}$ 240 mμ (ε16,930)

EXAMPLE 2

*17α-Acetoxy-16α-Methylpregna-4,6-Diene-3,20-Dione*

(I; R=—CH=CH—, R'=Ac)

17α-acetoxy-3β-hydroxy-16α-methylpregn-5-en-20 - one (II; R=R''=H, R'=Ac) (prepared as described in Example 1) (5 g.), aluminum tert.-butoxide (5 g.) and p-benzoquinone (6.6 g.) were mixed in dry benzene (500 ml.) and stirred at room temperature for 72 hours. The benzene was washed with 5% aqueous sodium hydroxide solution, dried and evaporated in vacuo. The residue crystallised from acetone/hexane to give 17α-acetoxy-16α-methylpregna-4,6-diene-3,20-dione.

EXAMPLE 3

*3β-Acetoxy-17α-Hydroxy-6,16α-Dimethylpregn-5-En-20-One*

(II; R=CH$_3$, R'=H, R''=Ac)

A solution of 3β-acetoxy-17a-hydroxy-6-methyl - 16-methylenepregn-5-ene-20-one (III; R=CH$_3$, R''=Ac) (5 g.) in absolute ethanol (500 ml.) was shaken in hydrogen over 5% palladium on charcoal (1.0 g.) at 23° C. and 800 mm. The hydrogenation was stopped when approximately 1 equivalent of hydrogen had been absorbed and uptake had become slow. Removal of the catalyst and solvent, and crystallisation of the residue from methanol furnished 3β-acetoxy-17α-hydroxy-6,16α - dimethylpregn-5-en-20-one, M.P. 123 to 124° C., $[\alpha]_D^{25}$ −82° (c., 0.23 in chloroform).

*3β,17α-Diacetoxy-6,16α-Dimethylpregn-5-En-20-One*

(II, R=CH$_3$, R'=R''=Ac)

To the foregoing compound (II; R=CH$_3$, R'=H, R''=Ac) (5 g.) dissolved in acetic anhydride (25 ml.) at 90° C. was added toluene-p-sulphonic acid (0.5 g.) and the mixture was kept at that temperature for 30 minutes. The reaction was cooled and poured into water. The precipitate was collected, washed and dried and crystallised from methanol to yield 3β,17α-diacetoxy-6,16α-dimethylpregn-5-en-20-one, M.P. 186 to 187° C., $[\alpha]_D^{25}$ −58° (c., 0.21 in chloroform).

*17α-Acetoxy-3β-Hydroxy-6,16α-Dimethylpregn-5-En-20-One*

(II; R=CH$_3$, R'=Ac, R''=H)

The above diacetate (10 g.) was dissolved in methanol (250 ml.) containing concentrated hydrochloric acid (2.5 ml.) and heated under reflux for 90 minutes. Removal of the solvent gave 17α-acetoxy-3β-hydroxy-6,16α-dimethylpregn-5-en-20-one purified from methanol, M.P. 177 to 178° C., [α]$_D^{25}$ −46° (c., 0.24 in chloroform).

*17α-Acetoxy-6,16α-Dimethylpregna-4,6-Diene-3,20-Dione*

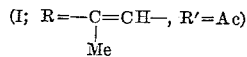

The above compound (5 g.) aluminium t-butoxide (5 g.) and p-benzoquinone (7.5 g.) were mixed with dry toluene (250 ml.) and stirred at room temperature for 3 days. The toluene was washed with 5% aqueous sodium hydroxide solution and water, and evaporated in vacuo. The residue crystallised from methanol to give 17α-acetoxy-6,16α-dimethylpregna-4,6-diene-3,20-dione, M.P. 202 to 204° C., [α]$_D^{23}$ +21° (c., 0.38 in chloroform)

$\lambda_{max.}^{EtOH}$ 286 mμ (ε22,300)

EXAMPLE 4

*17α-Acetoxy-6α,16α-Dimethylpregn-4-Ene-3,20-Dione*

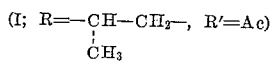

17α - acetoxy-3β-hydroxy-6,16α-dimethylpregn-5-en-20-one (II; R=CH$_3$, R'=Ac, R"=H) (prepared as described in Example 3) (5 g.) dissolved in dry cyclohexanone (60 ml.) was added to aluminium tert.-butoxide (5 g.) dissolved in dry toluene (40 ml.) and the mixture was refluxed for 30 minutes; Rochelle salt solution was added and the organic solvents removed from the reaction mixture by steam distillation. The aqueous layer was extracted with ether, and the residue from the ether extracts was crystallised from methanol to give 17α-acetoxy-6α,16α-dimethylpregn-4-ene-3,20-dione, M.P. 164 to 165° C., [α]$_D^{26}$ +74° (c., 0.96 in CHCl$_3$), $\lambda_{max.}^{EtOH}$ 240 mμ (ε15,540)

EXAMPLE 5

*3β-Acetoxy-17α-Caproyloxy-6,16α-Dimethylpregn-5-En-20-One*

(II; R=CH$_3$, R'=COC$_5$H$_{11}$, R"=Ac)

3β - acetoxy-17α-hydroxy-6,16α-dimethylpregn-5-en-20-one (II; R=CH$_3$, R'=H, R"=Ac) (5 g.) was dissolved in caproic acid (50 ml.) and caproic anhydride (25 ml.) with toluene-p-sulphonic acid monohydrate (750 mgm.) and the mixture was kept at room temperature for 3 days. Pyridine was added and the organic solvents were removed by steam distillation. The oily residue was isolated with ether and purified by repeated crystallisation from ethanol to give 3β-acetoxy-17α-caproyloxy-6,16α - dimethylpregn - 5 - en - 20 - one (II; R=CH$_3$, R'=COC$_5$H$_{11}$, R"=Ac). This diester (II; R=CH$_3$, R'=COC$_5$H$_{11}$, R"=Ac) was preferentially hydrolysed with acid as described above to give 17α-caproyloxy-3β-hydroxy - 6,16α-dimethylpregn-5-en-20-one (II; R=CH$_3$, R'=COC$_5$H$_{11}$, R"=H).

*17α-Caproyloxy-6,16α-Dimethylpregna-4,6-Diene-3,20-Dione*

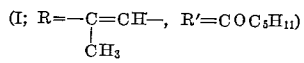

The above compound (II; R=CH$_3$, R'=COC$_5$H$_{11}$, R"=H) was oxidised with p-benzoquinone as described above in Example 2 to give 17α-caproyloxy-6,16α-dimethylpregna-4,6-diene-3,20-dione.

We claim:
1. A process for the preparation of 17α-acyloxy-16α-methylpregnane derivatives having the formula

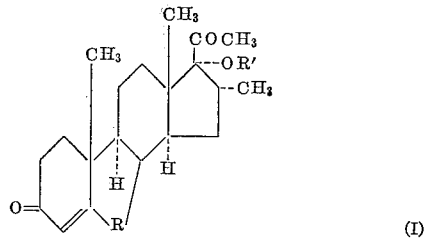

where R is selected from the group consisting of

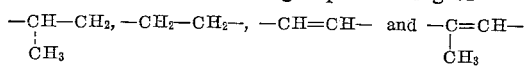

and R' is an acyl group of a hydrocarbon carboxylic acid containing up to six carbon atoms said process comprising selectively hydrogenating the 16-methylene group of a 3β - acyloxy-17α-hydroxy-16-methylenepregn-5-en-20-one of formula

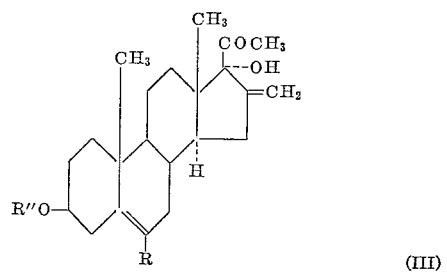

(where R is selected from the group consisting of hydrogen and methyl and R" is an acyl group of a hydrocarbon carboxylic acid containing up to six carbon atoms) to yield the 16α-methyl derivative of formula

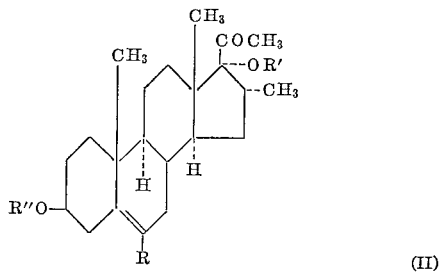

(where R is selected from the group consisting of hydrogen and methyl, R' is hydrogen and R" is an acyl group as defined above), acylating the 17α-hydroxy group to give a 3β,17α-diacyloxy-16α-methyl derivative of Formula II (where R is selected from the group consisting of hydrogen and methyl and R' and R" are acyl groups as defined above), selectively hydrolysing the 3β-acyloxy group to give a 17α-acyloxy-3β-hydroxy-16α-methyl derivative of Formula II (where R is selected from the group consisting of hydrogen and methyl, R' is an acyl group as defined above and R" is hydrogen) and oxidising to convert the 3β-hydroxy-Δ$^5$ derivative (II; where R is selected from the group consisting of H and CH$_3$, R' is an acyl group as defined above, and R" is H) into a steroid selected from the group consisting of Δ$^4$-3-ketones and Δ$^{4,6}$-3-ketones.

2. A process as claimed in claim 1 wherein the selective hydrogenation is performed by treating a solution of the 3β - acyloxy-17α-hydroxy-16-methylenepregn-5-en-20-one in an inert solvent with an atmosphere of hydrogen under a pressure of between 1 and 2 atmospheres in the presence of a pre-reduced catalyst.

3. A process as claimed in claim 2 wherein the inert solvent is ethanol.

4. A process as claimed in claim 2 wherein the pre-reduced catalyst is palladium on charcoal.

5. A process as claimed in claim 1 wherein the selective hydrolysis of the 3β-acyloxy group is achieved by treating the diacycloxy derivative in solution in methanol containing a small quantity of mineral acid.

6. A process as claimed in claim 1 wherein the oxidation of the 3β-hydroxy-$\Delta^5$-derivative is performed under Oppenauer conditions.

7. A process as claimed in claim 6 wherein oxidation of the 3β-hydroxy-$\Delta^5$-derivative to the corresponding $\Delta^4$-3-ketone is performed by oxidation of the Oppenauer type using a hydrogen acceptor selected from the group consisting of cyclohexanone, methyl ethyl ketone and acetone and a catalyst selected from the group consisting of aluminium tert.-butoxide and aluminium isopropoxide in an inert solvent.

8. A proces as claimed in claim 6 wherein oxidation of the 3β-hydroxy-$\Delta^5$-derivative to the $\Delta^{4,6}$-3-ketone is carried out by a modified Oppenauer type procedure employing p-benzoquinone as hydrogen acceptor and a catalyst selected from the group consisting of aluminium tert.-butoxide and aluminium iso-propoxide.

References Cited in the file of this patent

UNITED STATES PATENTS 2,880,214    Moffett et al. _____ Mar. 31, 1959

OTHER REFERENCES

De Ruggieri et al.: J.A.C.S., 1959, pages 5725–5727.
Cutler et al.: J.O.C., vol. 24, 1959, pages 1629–1632.
Ellis et al.: J.C.S., July 1960, pages 2828–2833.